US011544086B2

(12) United States Patent
Le Perlerin et al.

(10) Patent No.: US 11,544,086 B2
(45) Date of Patent: *Jan. 3, 2023

(54) PERFORMING A CONTEXT-DEPENDENT TASK IN A PROGRAM

(71) Applicant: NAGRAVISION S.A., Cheseaux-sur-Lausanne (CH)

(72) Inventors: Alain Le Perlerin, Renens (CH); Pierre Sarda, Echallens (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 198 days.

This patent is subject to a terminal disclaimer.

(21) Appl. No.: 17/136,613

(22) Filed: Dec. 29, 2020

(65) Prior Publication Data
US 2021/0117212 A1    Apr. 22, 2021

Related U.S. Application Data

(63) Continuation of application No. 16/322,585, filed as application No. PCT/EP2017/069719 on Aug. 3, 2017, now Pat. No. 10,908,932.

(30) Foreign Application Priority Data

Aug. 3, 2016  (EP) .................................... 16182645

(51) Int. Cl.
| G06F 9/45 | (2006.01) |
| G06F 9/451 | (2018.01) |
| G06F 9/445 | (2018.01) |
| G06F 8/38 | (2018.01) |
| G06F 9/48 | (2006.01) |
| G06F 9/54 | (2006.01) |

(52) U.S. Cl.
CPC ................ *G06F 9/451* (2018.02); *G06F 8/38* (2013.01); *G06F 9/445* (2013.01); *G06F 9/48* (2013.01); *G06F 9/54* (2013.01)

(58) Field of Classification Search
None
See application file for complete search history.

(56) References Cited

U.S. PATENT DOCUMENTS

| 7,249,048 B1 | 7/2007 | O'Flaherty |
| 2014/0218372 A1 | 8/2014 | Missig |
| 2014/0229888 A1 | 8/2014 | Ko |

OTHER PUBLICATIONS

International Search Report and Written Opinion of the International Searching Authority dated Oct. 18, 2017 in PCT/EP2017/069719, 13 pages.
Steven Kendall, et al., "Multifunction GPS Embedded Wrist Device for Runners" Consumer Electronics (ISCE), 2012 IEEE 16th International Symposium,, XP032203132, Jun. 4, 2012, pp. 1-4.

*Primary Examiner* — Craig C Dorais
(74) *Attorney, Agent, or Firm* — Oblon, McClelland, Maier & Neustadt, L.L.P.

(57) ABSTRACT

A computer implemented method for sending context information between programs, the method including: displaying a graphical user interface including a plurality of selectable application icons; receiving a simultaneous selection of a first icon and a second icon from the plurality of selectable application icons; launching a first program associated with the first icon; launching a second program associated with the second icon; and sending context information between the first program and the second program.

15 Claims, 6 Drawing Sheets

PERFORMING A CONTEXT-DEPENDENT TASK IN A PROGRAM

This application is a continuation Application of U.S. application Ser. No. 16/322,585, filed Feb. 1, 2019, which is a National Stage application of PCT/EP2017/069719, filed Aug. 3, 2017, and claims priority to European Priority Application No. 16182645.8 filed Aug. 3, 2016. The entire contents of the above-identified applications are incorporated herein by reference.

FIELD

The present disclosure relates to a system and method for performing a task in an application in dependence on context information, where the context information can be provided by way of communication between applications.

BACKGROUND

An application or program can provide many functionalities to a user of a computing device. The functionalities of an application or program are accessible through, for example, a menu or other options within the application. However, applications are generally self-contained. Furthermore, the pages, menu options or content of an application are statically organized. A user therefore has to browse through menu options whenever they want to perform a specific action, reach specific content or see a particular application page.

Improved functionality of an application can be achieved by improving the performance of tasks or functions within said program or application.

DETAILED DESCRIPTION OF THE DRAWINGS

Figure 1:
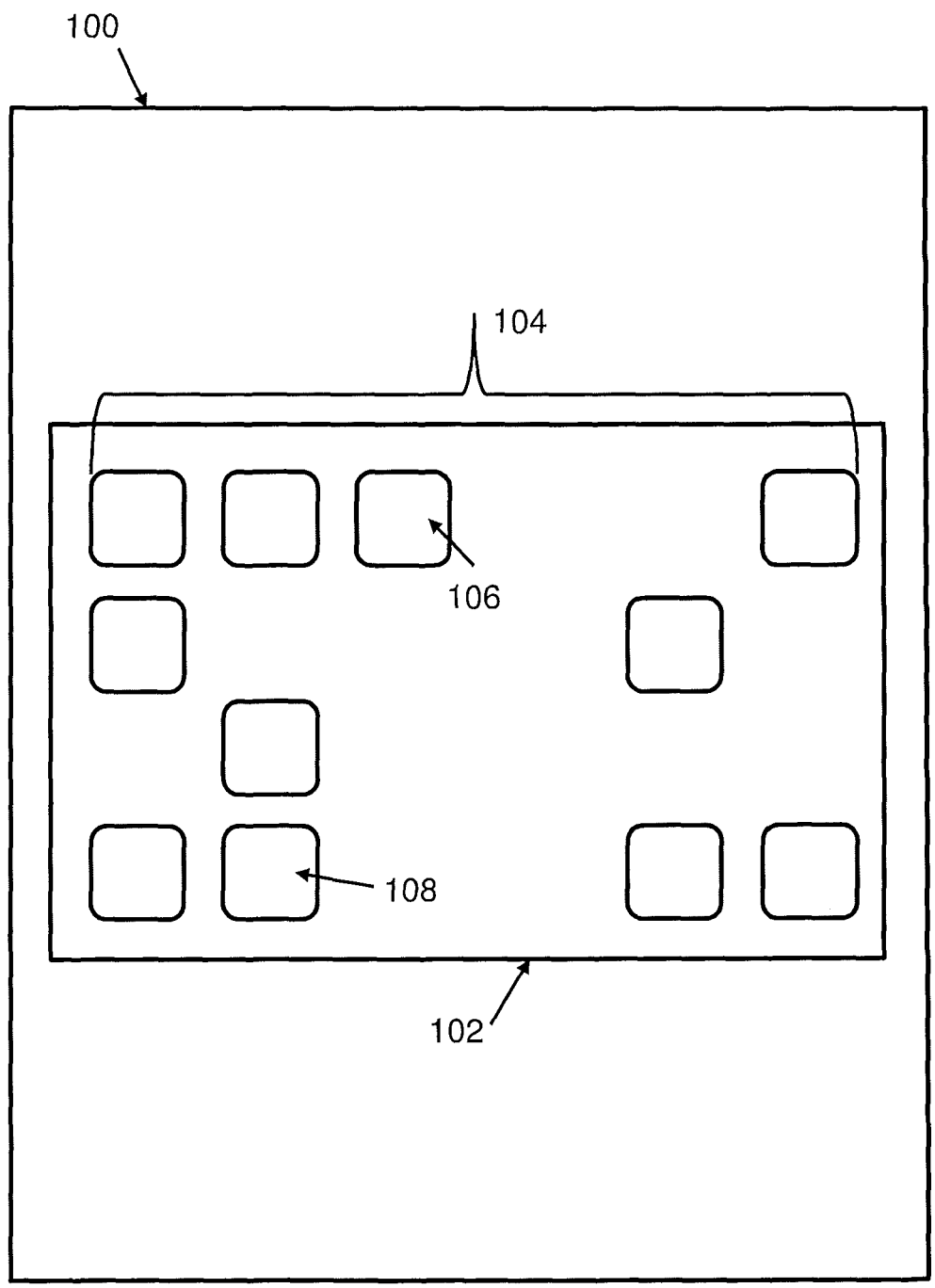
FIG. 1 illustrates a hardware infrastructure for implementing an embodiment.

In overview, a system for and method for sending context information for carrying out a context-dependent task is disclosed. A task is performed in a primary program in dependence on a context, where both the primary program and the context are selectable, for example by a user. Information related to the selected context can be provided to the primary program. In this way, information associated with the selected context can be combined with information from the selected primary program such that the primary program carries out a task in dependence on the provided context information, thereby improving the functionality of the primary program. For example, a user can see different information or content, or perform different actions, within the primary program; the provided content or available actions are dependent on the particular context selected.

In some aspects of the disclosure a method comprises a method of sending context information for carrying out a context-dependent task. The method comprises displaying a user interface comprising a plurality of selectable elements. The plurality of selectable elements may be program or application icons on a hand held device (such as a cellular device or smartphone, or a tablet). Alternatively, the selectable elements may be links or icons on a web browser. Alternatively, the selectable elements may be program or application icons on a personal computer, for example. Alternatively, the selectable elements can be any other form of selectable element. The method further comprises receiving a selection of a first element and a selection of a second element from the plurality of selectable elements. The first element may be associated with, or correspond to, a first program. The second element may be associated with or correspond to a context. Alternatively, the second element may be associated with, or correspond to, a second program. The first program may be a primary program and the second program may be a context program or a context menu. The context program can be configured to provide context information to the primary program.

The method further comprises launching the first program and performing a task in the first program in dependence on the second element that has been selected. In this way, the task can be performed in the primary program using context information which is related to the particular context, or provided from the particular context program, associated with the selected second element. Thus, the disclosed method may be more efficient (since, for example, only one program needs to be accessed by a user whilst still providing the user with information related to the desired context) and use fewer computer resources.

Selection of the first element may be made and then the selection may be maintained until selection of the second element. Selection of the second element may be made and then the selection may be maintained until selection of the first element. Alternatively, selection of the first and second elements may be simultaneous, or may be ordered in such a way that a primary program and a context program or context can be distinguished by the device, for example where both the first and second elements are selected within a pre-determined period of time or in a pre-determined order. As such, the user can quickly and easily specify which context information is required or which context should be used upon launch of the primary program (if any).

If selection of the first element is made before selection of the second element, the user may select the primary program and then subsequently select the second element depending on which context information they wish to incorporate within the primary program associated with the selected first element. Alternatively, if the second, contextual, element is selected before the first element, a user may maintain a selection of the second element until an indication of context appears on elements of the plurality of selectable elements. The indication of context may indicate that inter-application communication can occur between a context program or menu associated with the second element and other programs associated with those elements of the plurality of selectable elements which comprise the indication of context. Alternatively, the indication of context may indicate that a task can be performed in the programs associated with those elements of the plurality of selectable elements which comprise the indication of context in dependence on a context associated with the second element.

In other embodiments where the second, contextual, element is selected before the first element, a user may maintain selection of the second element until an indication of context appears on the second element. The user may then select a first element associated with a first program in order to launch the first program; the selection of the first element may be made whilst selection of the second element is maintained or after the second element is released.

In other embodiments, the step of displaying may comprise displaying at least one of the plurality of the selectable elements after receiving the selection of the first element. For example, selection of the first element may be maintained until one or more of the plurality of selectable elements are displayed, in any suitable selection layout, on a user interface. All of the selectable elements may be displayed after receiving the selection of the first element, or only a subset of the selectable elements may be displayed in the selection layout. For example, all of the plurality of selectable elements except the first element may be displayed, or those selectable elements associated with a program or application which cannot be used in a context dependent task may not be displayed. Selection of the second element may be made from the selectable elements displayed after receiving the selection of the first element. In one embodiment, the first element may be displayed in the middle left of the user interface and a subset of elements displayed to the right of the first element. For example, each of the elements in the subset of the plurality of elements may be displayed on a different line, one element per line. A user may then release the first element and select a second element from the displayed subset of elements. A user may scroll through the list of elements if not all of the elements can be displayed on the user interface at once. Scrolling may be achieved by swiping a display screen vertically down or up, in embodiments where the computing device is a mobile handheld device. Alternatively, scrolling may be achieved by using the scroll button on a mouse, where the computing device is a personal computer.

Alternatively, selection of the second element may be maintained until all, or a subset of, the plurality of selectable elements are displayed in a selection layout in any suitable layout. In one example, selection of the first element may then be made from a displayed subset of the plurality of selectable elements. In one embodiment, the second element may be displayed in the middle left of the user interface and the subset of elements displayed to the right of the second element.

Alternatively, the initially selected element (whether that is the first or second element) may be displayed in any position on the user interface and all, or a subset of, the plurality of selectable elements may be displayed in any suitable arrangement around, above, below, to the left, or to the right of the initially selected element in any suitable selection layout.

The step of performing a task in the first program in dependence on the second element that has been selected may comprise the first program sending a request for data to a second program associated with, or corresponding to, the second element. The second program then sends data to the first program in response to the request. The first program receives the data and performs the task in dependence on the received data. For example, the first, primary, program may be a "MAP" application and the second, context, program may be a "WEATHER" application. The first program sends a request for weather data at a given location (for example, a location entered by a user) to the second program. The first program receives the weather data and performs the desired task, for example, the task may be displaying the location on a map whilst incorporating the weather data sent by the second program. For example, the map may show Paris and simultaneously show the weather in Paris within the primary "MAP" application. In this way, computer resources are used more efficiently since only the "MAP" application needs to be running in the foreground; the "WEATHER" application can run in the background and can be stopped once the information requested by the first program has been retrieved from it.

Alternatively, the step of performing a task in the first program in dependence on the second element that has been selected may comprise a second program associated with the second element sending data to the first program in the absence of a request from the first program; for example, the selection of the second program by constitute a request for data. Regardless of the specific implementation, the above method can enable a primary program to get background information, or other metadata, from another, context, program, or to get information relating to a desired context.

Further aspects of the disclosure relate to a system and non-transitory computer readable storage media for carrying out the method described above.

In the following description, programs will be referred to as applications (e.g. the first program is termed the first application, and the second program is termed the second application). In any of the embodiments, application is to be interpreted as application software. For example, an application can be any program or piece of software designed to perform a group of coordinated functions or tasks on a computing device. Application is not limited to mobile applications (or "apps"), for example, those downloaded to a mobile device or other hand held electronic device (e.g., a smartphone or a tablet).

In any of the embodiments, context information is implemented as metadata, i.e. as information and/or data contained in, provided by, or related to, the context application or context. For example, context information can be weather information, location information, email or bank account password information (for example where the context application is an application for secure password storage), or other data. The context information is used to implement the idea of performing actions or tasks in an application in accordance with a general context, where the context can be "location", "weather", "travel", "shopping" and the like.

In embodiments where the second element is associated with an application, inter-application communication can occur between the first, primary, application (associated with the first element) and a second, context, application (associated with the second element). When selected, the primary and context applications can communicate with one another in a controlled manner and without compromising the separation of the two applications, since that data (such as context information) which is accessible for use in the inter-application communication can be clearly defined and ring-fenced. Such inter-application communication can improve the use of a device, since a user can obtain information more quickly and efficiently. Furthermore, fewer computer resources are required since a user does not have to start both the primary and context applications to obtain all of the desired information; one or both of the primary and context applications can perform the tasks necessary for inter-application communication and the provision of context-based information whilst running in the device background. In this way, specific information from the context application can be used in the primary application without the need to successively and separately run the two applications. Furthermore, fewer computer resources can be used since the context application does not necessarily have to run in full; predetermined or specific information can be provided to the primary application whilst the context application runs in the background.

The inter-application communication or context dependent tasks described herein can facilitate the employment of metadata in the primary application to perform a task in dependence on an overall context. For example, if the second application is a "SHOPPING" application, the context information may be the locations of the shops. When the primary application is a "MAP" application, performing a task in the "MAP" application in dependence on the second element could therefore be to display the locations of specific shops on a map, where the locations are provided to the first application by the second, context, application. Alternatively, the context may be "shopping" and the metadata exchanged between the context application and the primary application may be "the address of a shopping centre near me", where the nearest shops are then displayed within the "MAP" application. Alternatively, a user may select the "MAP" application as a "location" context and then launch a "BANKING" application to see the location of their bank, for example.

In another example, a context application can be a "TRAVEL" application, which provides the context of "travel" to the first application. The first application may be the "SETTINGS" application. The "SETTINGS" application may receive context information indicating that the context is "travel". Performing a task in the "SETTINGS" application in dependence on the context "travel" may comprise, for example, displaying the specific settings page of the "TRAVEL" application itself or displaying a page indicating the roaming functionality of the device.

The "TRAVEL" application (or other context application) may have other metadata associated with it that is not recognised by the "SETTINGS" application (or other primary application). The unrecognised metadata may then be ignored by the first, primary, application. Alternatively, such metadata may not be provided to the primary application by the context application.

Some specific embodiments are now described by way of illustration with reference to the accompanying drawings in which like reference numerals refer to like features.

With reference to FIG. 1, a device 100 comprises a user interface 102. In the preferred embodiment, the user interface is displayed within the environment of a hand held device.

For example, device 100 can be a smartphone and user interface 102 is a graphical user interface displayed to the smartphone user. Context information can be sent within the smartphone environment. Alternatively device 100 can be a tablet or any other hand held device. The user interface 102 comprises a plurality of selectable elements 104. The plurality of selectable elements 104 comprises a first element 106 and a second element 108. The first element 106 is associated with a first application. In a preferred embodiment, the first element 106 is a selectable application icon. The second element 108 is associated with a second application. In the preferred embodiment, the second element 108 is also a selectable application icon.

Figure 2:
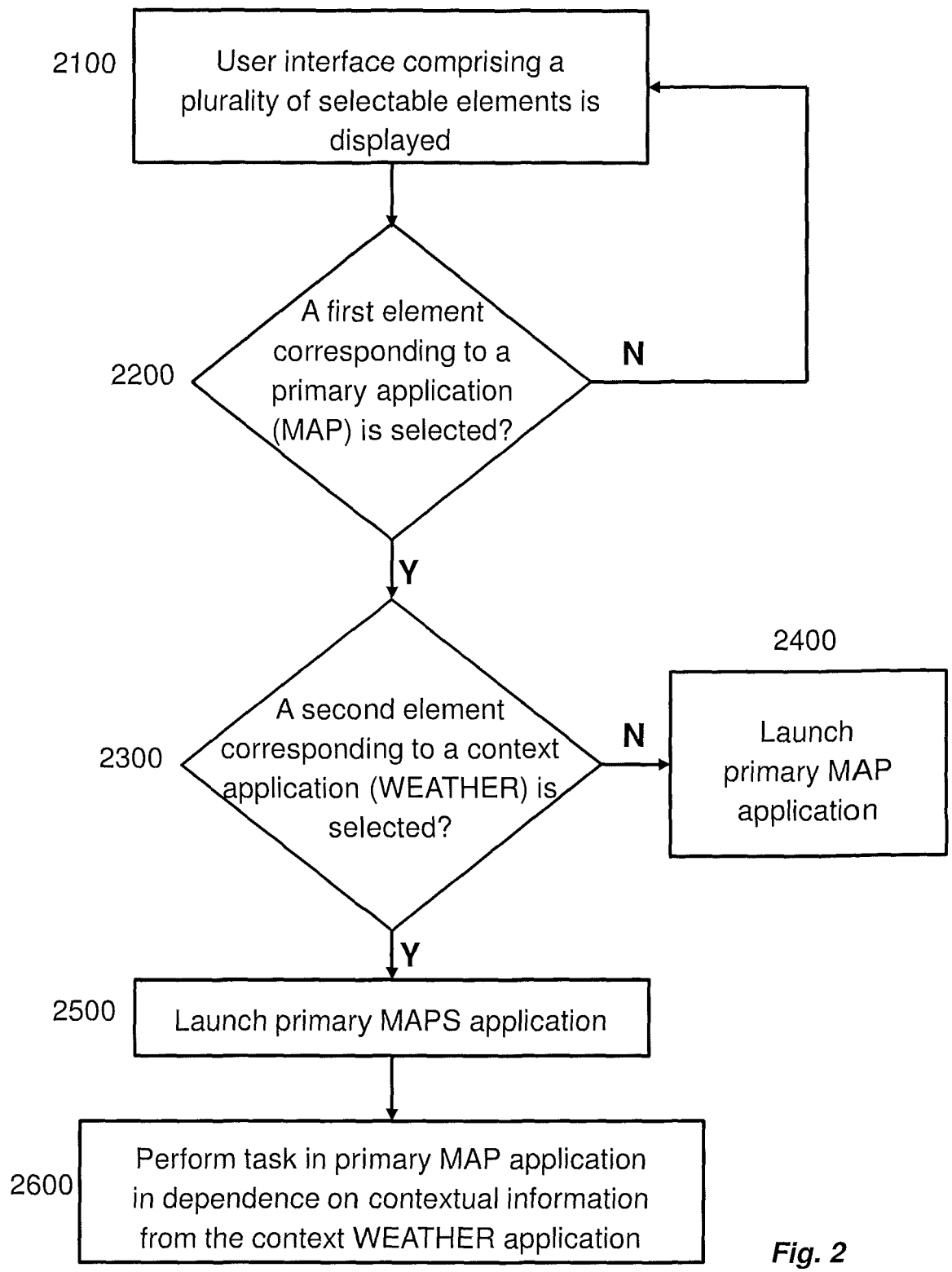
FIG. 2 illustrates a flowchart of a method of inter-application communication according to one embodiment.

With reference to FIG. 2, a method implemented by the device 100 in one embodiment is now described. At step 2100 the user interface 102 displays a plurality of selectable elements. At step 2200, a first element 106 corresponding to, or associated with, a primary application may be selected. The first element 106 may be selected by a user. In this embodiment, the primary application is a "MAP" application. If the first element 106 is not selected, the method returns to step 2100 and the user interface 102 continues to display the plurality of selectable elements.

At step 2200, if the first element 106 is selected, the method moves to step 2300. At step 2300, the second element 108 corresponding to, or associated with, a context application may be selected. The second element 108 may be selected by a user. In this embodiment, the context application is a "WEATHER" application. If the second element 108 is not selected, the primary "MAP" application is launched at step 2400 without any context information and tasks are performed within the primary "MAP" application without any dependence on the context application associated with the second element 108.

At step 2500, if the second element 108 is selected, the "MAP" application is launched. At step 2600, a task is performed in the primary application in dependence on the second element. In particular, the task is performed in dependence on context information associated with the context "WEATHER" application. For example, weather is shown for the location displayed in the map function of the primary application. In this embodiment, the weather at the location is the context information.

With reference to the embodiment shown in FIG. 2, the first element 106 may be selected (by a user or otherwise) before selection of the second element 108. The first element 106 may remain selected until the second element 108 is selected, at which time both elements may be released. The primary application may then launch. Alternatively, the first element may be selected and then released and the second element may be selected within a predefined time period after the first element is selected in order to launch the primary application with context information from the context application. Alternatively, the first element 106 and the second element 108 may be selected simultaneously.

Figure 3:
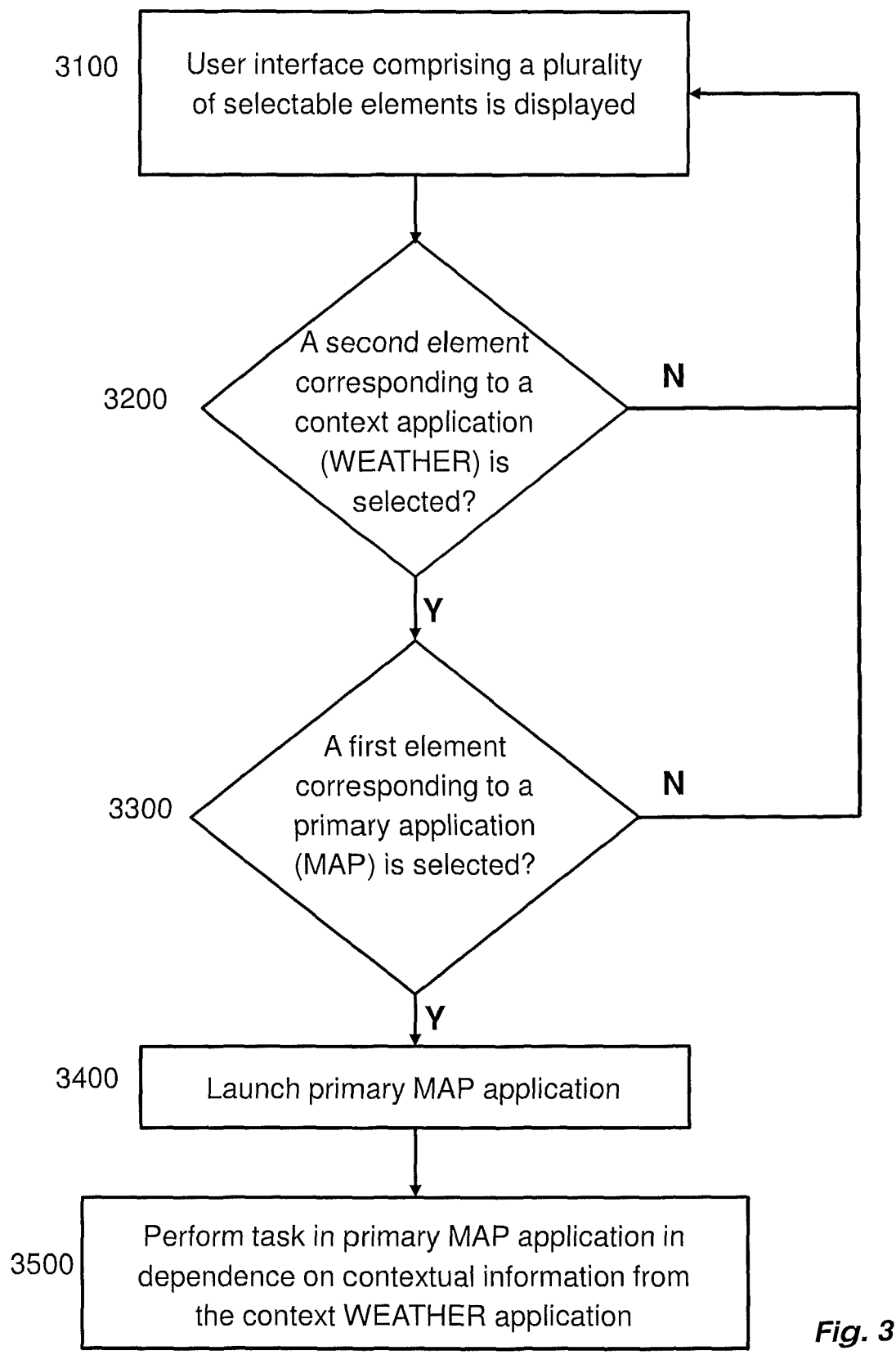
FIG. 3 illustrates a flowchart of a method of inter-application communication according to a second embodiment.

With reference to FIG. 3, a method implemented by the device 100 in a second embodiment is now described. At step 3100 the user interface 102 displays a plurality of selectable elements. At step 3200, the second element 108 corresponding to, or associated with, a context application may be selected. The second element 108 may be selected by a user. In this embodiment, the context application is a "WEATHER" application. If the second element 108 is not selected, the method returns to step 3100 and the user interface 102 continues to display the plurality of selectable elements. At step 3200, if the second element 108 is selected (or released), the method moves to step 3300.

At step 3300, a first element 106 corresponding to, or associated with, a primary application may be selected. The first element 106 may be selected by a user. In this embodiment, the primary application is a "MAP" application. If the first element 106 is not selected, the method returns to step 3100 and the user interface 102 continues to display the plurality of selectable elements. At step 3400, if the first element 106 is selected, the "MAP" application is launched. At step 3500, a task is performed in the primary application in dependence on the second element. In particular, the task is performed in dependence on context information associated with the context "WEATHER" application. For example, weather is shown for the location displayed in the map function of the primary application. In this embodiment, the weather at the location is the context information.

With reference to the embodiment shown in FIG. 3, the second element 108 may be selected (by a user or otherwise) before selection of the first element 106. The second element 108 may remain selected until the first element 106 is selected. The first element associated with the primary application may then be released and then the second element associated with the context application may then be released. The first, primary, application may then launch. Alternatively, the second element 108 may be selected and then released and the first element 106 may be selected within a predefined time period after the second element 108 is selected (or released) in order to launch the primary application with context information from the second, context, application. Alternatively, the first element 106 and the second element 108 may be selected simultaneously.

Figure 4:
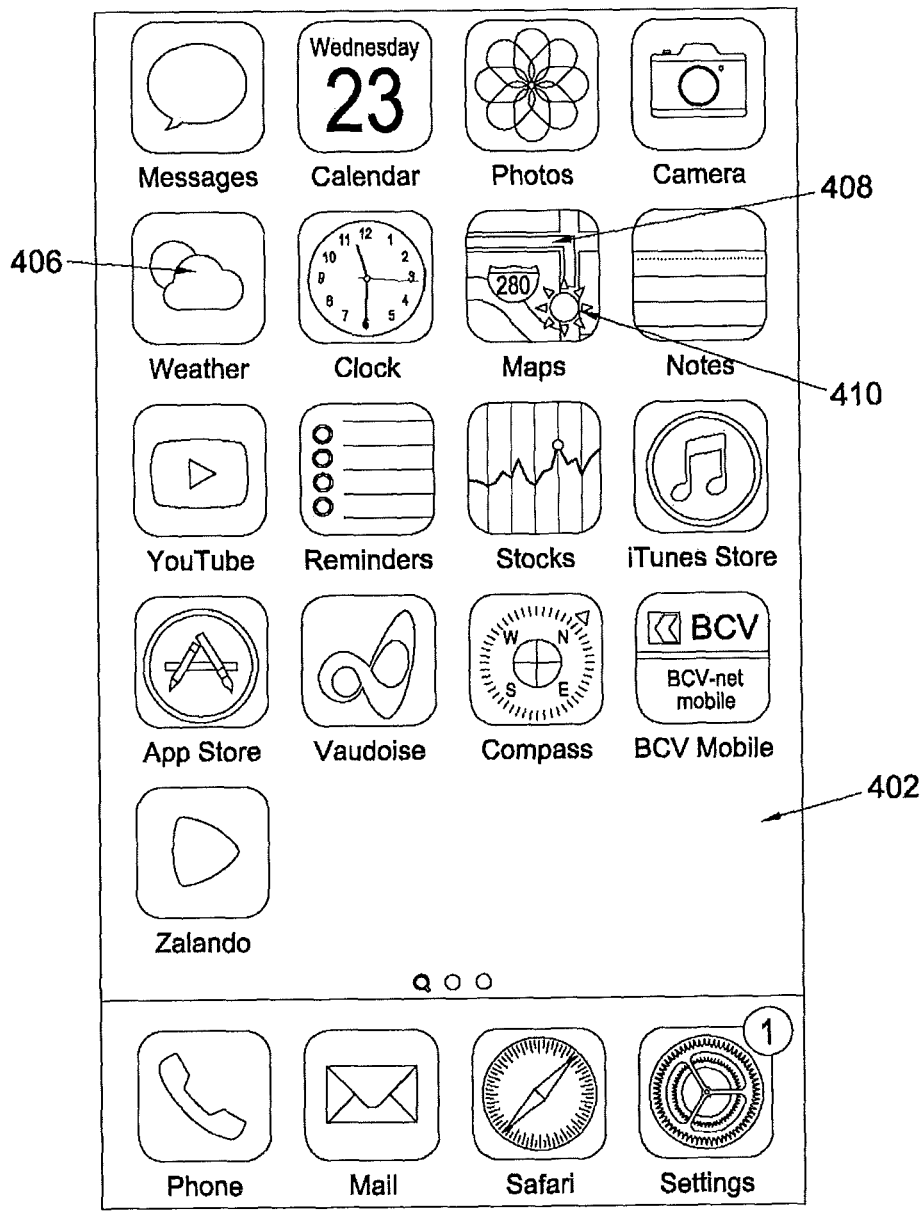
FIG. 4 illustrates an interface for implementation of an embodiment.

FIG. 4 illustrates a graphical user interface 402 within a smartphone or tablet environment, or within the environment of another hand held device. The graphical user interface 402 is an example of user interface 102. A second element 408 associated with the desired context application may be selected and the selection maintained (for example, the icon held down by a user) until a badge or context icon 410 (an indication of context) is displayed on the second element 406. The indication of context may alternatively or additionally be a blinking selectable element, for example. A first element 406 associated with the desired primary application may then be selected. In the embodiment described with reference to FIG. 4, the context application is the "MAP" application and the primary application is the "WEATHER" application.

Figure 5:
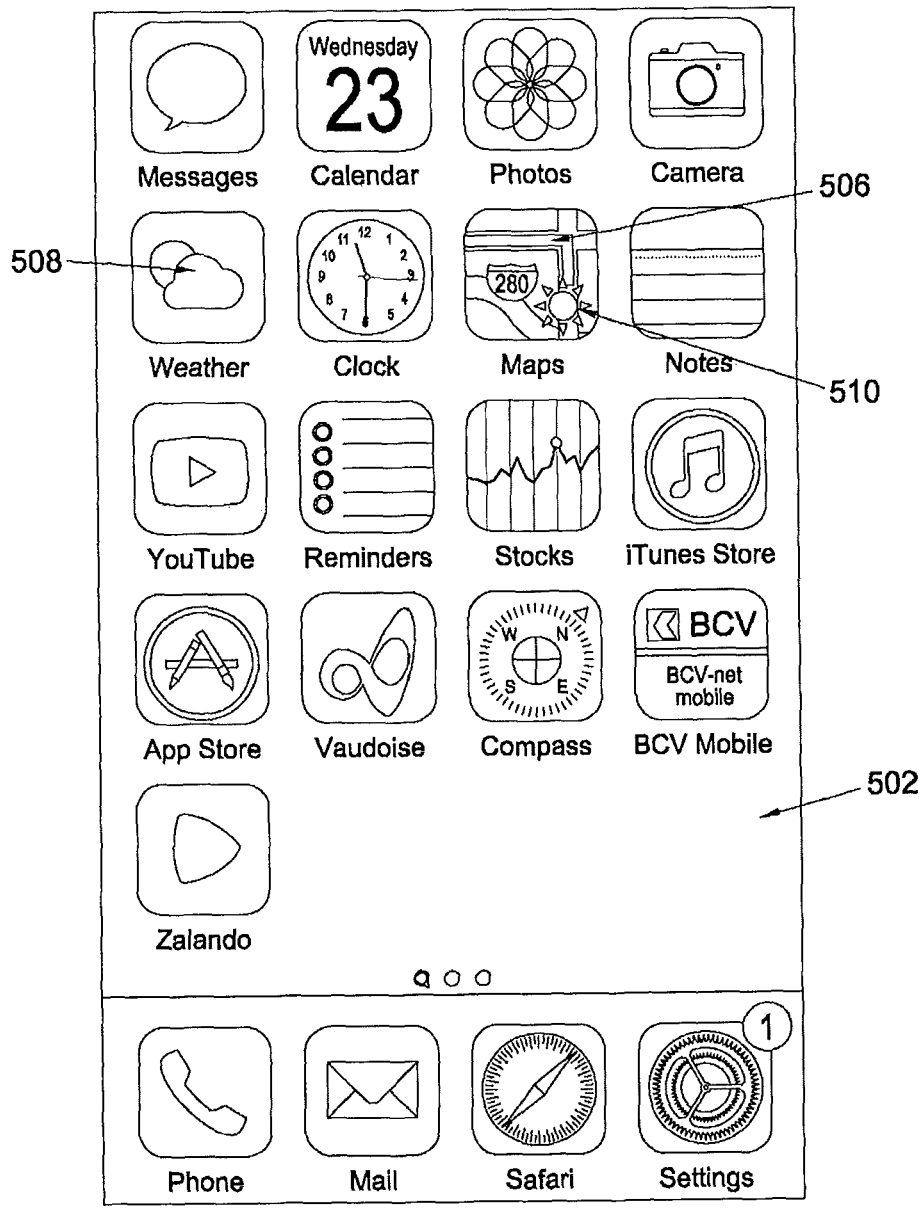
FIG. 5 illustrates an interface for implementation of another embodiment.

FIG. 5 illustrates a graphical user interface 502 within a smartphone or tablet environment, or within the environment of another hand held device. The graphical user interface 502 is an example of user interface 102. A second element 508 associated with the desired context application may be selected (for example the icon held down by a user) and the selection maintained until a badge or context icon 510 (an indication of context) appears on elements of the plurality of selectable elements which can engage in inter-application communication with the selected context application. The indication of context may additionally or alternatively be a blinking selectable element, for example. A first element 506 associated with the desired primary application may then be selected. In the embodiment described with reference to FIG. 5, the context application is the "WEATHER" application and the primary application is the "MAP" application, as described with reference to FIG. 3.

Figure 6:
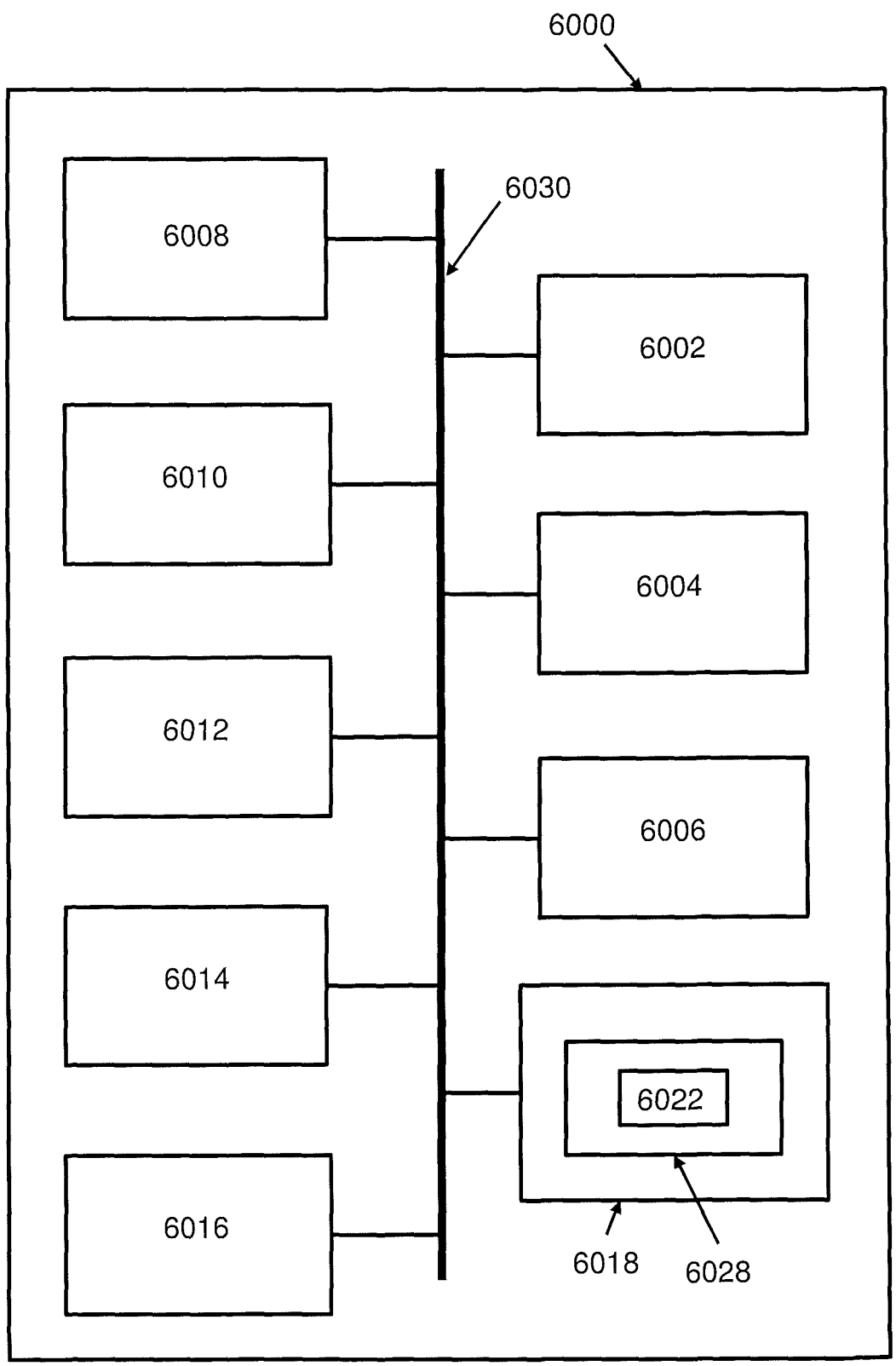
FIG. 6 illustrates a block diagram of one implementation of a computing device.

FIG. 6 illustrates a block diagram of one implementation of a computing device 6000 within which a set of instructions, for causing the computing device to perform any one or more of the methodologies discussed herein, may be executed. Computing device 6000 may be an example of device 100 described with reference to FIG. 1. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone or smartphone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 6000 includes a processing device 6002, a main memory 6004 (e.g., read-only memory (ROM), flash memory, dynamic random access memory (DRAM) such as synchronous DRAM (SDRAM) or Rambus DRAM (RDRAM), etc.), a static memory 6006 (e.g., flash memory, static random access memory (SRAM), etc.), and a secondary memory (e.g., a data storage device 6018), which communicate with each other via a bus 6030.

Processing device 6002 represents one or more general-purpose processors such as a microprocessor, central processing unit, or the like. More particularly, the processing device 6002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 6002 may also be one or more special-purpose processing devices such as an application specific integrated circuit (ASIC), a field programmable gate array (FPGA), a digital signal processor (DSP), network processor, or the like. Processing device 6002 is configured to execute the processing logic (instructions 6022) for performing the operations and steps discussed herein.

The computing device 6000 may further include a network interface device 6008. The computing device 6000 also may include a video display unit 6010 (e.g., a liquid crystal display (LCD) or a cathode ray tube (CRT)), an alphanumeric input device 6012 (e.g., a keyboard or touchscreen), a cursor control device 6014 (e.g., a mouse or touchscreen), and an audio device 6016 (e.g., a speaker).

The data storage device 6018 may include one or more machine-readable storage media (or more specifically one or more non-transitory computer-readable storage media) 6028 on which is stored one or more sets of instructions 6022 embodying any one or more of the methodologies or functions described herein. The instructions 6022 may also reside, completely or at least partially, within the main memory 6004 and/or within the processing device 6002 during execution thereof by the computer system 6000, the main memory 6004 and the processing device 6002 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein (for example device 100 in relation to FIG. 1) can be implemented as discrete components or integrated in the functionality of hardware components such as ASICS, FPGAs, DSPs or similar devices as part of an individualization server.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

In some examples, the primary application includes a dedicated function associated with the context application. When the primary and context applications are selected, this function can be started by the underlying operating system, where the function is parameterised with parameters received from the context application. In this example, the context application provides predetermined parameters to the primary application. The context application can be started in the background to deliver the predetermined parameters to the primary application. In this example, the primary application requests specific and predetermined context information from the context application in accordance with the function, and the context application provides the predetermined context information in response to the request.

In some examples, the context information is not requested by the primary application. Instead, the operating system can load the context information from the context application and push it to the launched primary application automatically.

In other examples, the information requested by the primary application may not be predetermined, and the primary application may access other information from the context application. The levels of access between the primary and context applications may preferably be predetermined such that inter-application communication (such as the sending of context information) occurs in a controlled, secure and well-defined manner.

In an example, a primary application may be an "EMAIL" application. A second, context, application may be a "PASSWORD MANAGER" application. The dedicated function of the "EMAIL" application requires password and log-in information to enable e-mail access. The "PASSWORD MANAGER" application is configured to return parameters to the "EMAIL" application in the form of a password or log-in information. When the user selects the "EMAIL" application with one finger, an indication of context may be shown on the second selectable element associated with, or corresponding to, the context application "PASSWORD MANAGER". If the user uses a second finger to select the second selectable element, then the operating system launches "PASSWORD MANAGER" in the background. The operating system then launches the "EMAIL" application and executes the dedicated function. The "PASSWORD MANAGER" application then returns a list of passwords as parameters into the dedicated function to enable access to e-mails via the "EMAIL" application. In the case where only a single password is required to log on, the "EMAIL" application will be launched using the password returned by the "PASSWORD MANAGER" application. In the case that multiple passwords are returned, the "EMAIL" application will display a message asking the user to select the appropriate log-on information to use out of the list of returned passwords.

In another example, the function of the "EMAIL" application can be parameterised using parameters from the context application "BIN". In this example, the operating system is configured to remove all emails in the deleted email folder when the "BIN" application is selected as the context application. The user can select the first selectable element corresponding to the primary "EMAIL" application, while simultaneously selecting the "BIN" application as a context application when an indication of context is provided. Upon selection of the "BIN" application, all of the emails in the deleted email folder are deleted. The "EMAIL" application is not started; rather, it works in the background to remove the method.

In some embodiments the first application is launched (or started) in the foreground and the context application, or second application, runs in the background. In other embodiments, the first application also runs in the background. In other embodiments, the first and second applications run in the background. In some embodiments, the first application and/or second application are stopped once the task has been performed in the first application.

Table 1 illustrates some further examples of inter-application functionality. The functionalities of the primary application which are underlined are those tasks which can be performed in dependence on the context.

TABLE 1

| Primary application | Functionality of primary application | Context application | Context based action |
|---|---|---|---|
| Travel | Book a trip, see the weather at booked destinations, see trip timings, etc. | Weather | Find weather information |
| Shopping store | Show products, show open hours, promotions, etc. | Clock | Look at the time |
| Bank | Show available credit, show transactions, show location of the bank, etc. | Map | Look for a location |
| Insurance | Show offers, show contact information, show account information, etc. | Phone | Make a call |
| GPS Navigator | Show roads, application settings, etc. | Settings | Change settings |

Unless specifically stated otherwise, as apparent from the following discussion, it is appreciated that throughout the description, discussions utilizing terms such as "displaying", "receiving", "launching", "running", "starting", "performing", "sending", "pushing", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

According to an aspect of the disclosure, a computer implemented method for carrying out a context-dependent task may comprise: displaying a user interface comprising a plurality of selectable elements; receiving a selection of a first element and a selection of a second element from the plurality of selectable elements; launching a first program associated with the first element; and performing a task in the first program in dependence on the second element that has been selected.

According to another aspect of the disclosure, a selection of the first element may be made and then a selection of the first element may be maintained until selection of the second element.

According to another aspect of the disclosure, a selection of the second element may be made and then selection of the second element may be maintained until selection of the first element.

According to another aspect of the disclosure, a second program may be associated with the second element.

According to another aspect of the disclosure, the step of performing may comprise the first program sending a request for data to the second program.

According to another aspect of the disclosure, the step of performing may further comprise the second program sending data to the first program in response to the request.

According to another aspect of the disclosure, the step of performing may further comprise receiving the data in the first program.

According to another aspect of the disclosure, the step of performing a task may comprise performing a task in dependence on the received data.

According to another aspect of the disclosure, the method may further comprise launching the second program.

According to another aspect of the disclosure, launching the second program may comprise launching the second program in the background.

According to another aspect of the disclosure, launching the first program may comprise launching the first program in the background.

According to another aspect of the disclosure, the method may further comprise pushing predefined data to the first program from the second program.

According to an aspect of the disclosure, one or more non-transitory computer readable media having computer-executable instructions may be provided to cause one or more computer systems to perform the computer implemented method for carrying out a context-dependent task.

According to an aspect of the disclosure, a system for carrying out a context-dependent task is provided. The system may comprise a processor arranged to: cause display of a user interface comprising a plurality of selectable elements; receive a selection of a first element and a selection of a second element from the plurality of selectable elements; launch a first program associated with the first element; and perform a task in the first program in dependence on the second element that has been selected.

According to another aspect of the disclosure, the processor may be arranged to perform the computer implemented method for carrying out a context-dependent task.

The invention claimed is:

1. A computer-implemented method for sending context information between programs, comprising:
   displaying a graphical user interface comprising a plurality of selectable application icons;
   receiving a first selection of a first icon and a second selection of a second icon from the plurality of selectable application icons; and
   directly in response to receiving the first selection of the first icon and the second selection of the second icon,
   launching a first program associated with the first icon;
   launching a second program associated with the second icon, wherein the launching of the first program and the launching of the second program are done simultaneously; and
   sending context information between the first program and the second program.

2. The method of claim 1, wherein the sending of the context information between the first program and the second program further comprises the first program sending a request for context information to the second program.

3. The method of claim 2, wherein the sending of the context information between the first program and the second program further comprises the second program sending the context information to the first program in response to the request.

4. The method of claim 3, further comprising receiving the context information in the first program.

5. The method of claim 4, further comprising performing a task in the first program in dependence on the received context information.

6. The method of claim 1, wherein the launching of the second program comprises launching the second program in a background.

7. The method of claim 1, wherein the launching of the first program comprises launching the first program in a background.

8. The method of claim 1, wherein the sending of the context information between the first program and the second program further comprises pushing predefined data to the first program from the second program.

9. One or more non-transitory computer readable media having computer-executable instructions to cause one or more computer systems to perform the method of claim 1.

10. A system for sending context information between programs, the system comprising processing circuitry configured to:
    cause display of a graphical user interface comprising a plurality of selectable application icons;
    receive a first selection of a first icon and a second selection of a second icon from the plurality of selectable application icons; and
    directly in response to receiving of the first selection of the first icon and the second selection of the second icon,
    launch a first program associated with the first icon;
    launch a second program associated with the second icon, wherein the launching of the first program and the launching of the second program are done simultaneously; and send context information between the first program and the second program.

11. The system of claim 10, wherein the processing circuitry is further configured to send a request for the context information from the first program to the second program.

12. The system of claim 11, wherein the processing circuitry is further configured to send the context information from the second program to the first program in response to the request.

13. The system of claim 12, wherein the processing circuitry is further configured to receive the context information in the first program.

14. The system of claim 13, wherein the processing circuitry is further configured to perform a task in the first program in dependence on the received context information.

15. The system of claim 10, wherein the processing circuitry is further configured to launch the second program in a background.

* * * * *